(12) United States Patent
Akoum et al.

(10) Patent No.: US 10,855,345 B2
(45) Date of Patent: Dec. 1, 2020

(54) GENERALIZED BEAM MANAGEMENT FRAMEWORK

(71) Applicant: AT&T Intellectual Property I, L.P., Atlanta, GA (US)

(72) Inventors: Salam Akoum, Austin, TX (US); Xiaoyi Wang, Austin, TX (US); Arunabha Ghosh, Austin, TX (US); Thomas Novlan, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/439,150

(22) Filed: Jun. 12, 2019

(65) Prior Publication Data

US 2020/0106488 A1 Apr. 2, 2020

Related U.S. Application Data

(60) Provisional application No. 62/738,284, filed on Sep. 28, 2018.

(51) Int. Cl.
*H04B 7/04* (2017.01)
*H04B 7/0426* (2017.01)
(Continued)

(52) U.S. Cl.
CPC .......... *H04B 7/043* (2013.01); *H04B 17/102* (2015.01); *H04B 17/345* (2015.01); *H04B 17/382* (2015.01); *H04W 52/365* (2013.01)

(58) Field of Classification Search
CPC .. H04B 7/0695; H04B 7/0617; H04B 17/345; H04B 7/0452; H04B 17/318; H04B 17/336; H04B 7/043; H04B 17/382
(Continued)

(56) References Cited

U.S. PATENT DOCUMENTS 9,398,481 B2 7/2016 Chai et al.
9,479,306 B2 10/2016 Mazzarese et al.
(Continued)

FOREIGN PATENT DOCUMENTS

WO 2018128940 A2 7/2018

OTHER PUBLICATIONS

International Search Report and Written Opinion for International Application No. PCT/US2019/047587 dated Nov. 7, 2019, 16 pages.

(Continued)

*Primary Examiner* — Emmanuel Bayard
(74) *Attorney, Agent, or Firm* — Amin, Turocy & Watson, LLP

(57) ABSTRACT

Various aspects of the technology described herein are directed towards a generalized beam management framework in which beam management takes into account interference to steer a beam. Aspects comprise configuring a report request comprising a resource setting with channel state information-reference signal resource data and an associated report setting with parameter data corresponding to the one or more channel state information-reference signal resources. The report request is configured to instruct a user equipment device to include interference information when performing user equipment device beam management and reporting. Upon receiving the report request, the user equipment performs a beam measurement operation that includes interference information when generating the beam management report sent to the network device.

20 Claims, 11 Drawing Sheets

(51) Int. Cl.
*H04W 52/36* (2009.01)
*H04B 17/382* (2015.01)
*H04B 17/345* (2015.01)
*H04B 17/10* (2015.01)

(58) Field of Classification Search
USPC ........ 375/144, 148, 267, 299, 347–349, 260
See application file for complete search history.

(56) References Cited

U.S. PATENT DOCUMENTS

| | | | |
|---|---|---|---|
| 9,949,298 | B1 | 4/2018 | Akoum et al. |
| 10,003,391 | B2 | 6/2018 | Liang |
| 10,009,905 | B2 * | 6/2018 | Kakishima ............ H04B 7/0413 |
| 2015/0282122 | A1 * | 10/2015 | Kim ................. H04L 25/03898 370/329 |
| 2016/0227426 | A1 * | 8/2016 | Hwang ................ H04B 17/309 |
| 2016/0249245 | A1 * | 8/2016 | Kim ..................... H04B 17/345 |
| 2018/0034612 | A1 | 2/2018 | Lin et al. |
| 2018/0124796 | A1 * | 5/2018 | Noh ..................... H04B 1/1027 |
| 2018/0131426 | A1 | 5/2018 | Lee et al. |
| 2018/0167883 | A1 | 6/2018 | Guo et al. |
| 2018/0175983 | A1 | 6/2018 | Yum et al. |
| 2018/0212651 | A1 | 7/2018 | Li et al. |
| 2018/0227031 | A1 | 8/2018 | Guo et al. |
| 2018/0227094 | A1 | 8/2018 | Liu et al. |
| 2018/0278314 | A1 | 9/2018 | Nam et al. |
| 2018/0279287 | A1 | 9/2018 | Wilson et al. |
| 2018/0287683 | A1 | 10/2018 | Subramanian et al. |
| 2019/0165846 | A1 * | 5/2019 | Kim ..................... H04B 7/0456 |
| 2019/0190582 | A1 * | 6/2019 | Guo ....................... H04B 7/088 |
| 2019/0215781 | A1 * | 7/2019 | Jeon ..................... H04W 52/241 |
| 2019/0215897 | A1 * | 7/2019 | Babaei ................. H04W 76/28 |
| 2019/0305830 | A1 * | 10/2019 | Zhou ...................... H04B 7/088 |
| 2019/0320364 | A1 * | 10/2019 | Jeon ..................... H04W 76/11 |
| 2020/0100232 | A1 * | 3/2020 | Onggosanusi ........ H04W 72/14 |

OTHER PUBLICATIONS

Intel Corporation, "RRM Measurements for NR", 3GPP Draft; RI-1717359 Intel RRM, 3rd Generation Partnership Project (3GPP), Mobile Competence Centre; 650, Route Des Lucioles; F-06921 Sophia-Antipolis Cedex; France vol. RAN WG1, No. Prague, Czech Republic; Oct. 9, 2017-Oct. 13, 2017, Oct. 8, 2017 (Oct. 8, 2017), XP051340549, Retrieved from the Internet: URL:http://www.3gpp.org/ftp/Meetings_3GPP_SYNC/RAN1/Docs/ [retrieved on Oct. 8, 2017], pp. 3,4,5.

* cited by examiner

GENERALIZED BEAM MANAGEMENT FRAMEWORK

CROSS-REFERENCE TO RELATED APPLICATIONS

This application is a non-provisional of U.S. Provisional Patent Application No. 62/738,284, filed on Sep. 28, 2018 entitled "GENERALIZED BEAM MANAGEMENT FRAMEWORK." The entirety of the aforementioned application is hereby incorporated herein by reference.

TECHNICAL FIELD

The subject application is related to wireless communication systems, and, for example, to performing beam management in the presence of interference, e.g., in a fifth generation (5G, sometimes referred to as New Radio (NR)) cellular wireless communications system.

BACKGROUND

Beam management comprises a set of procedures to acquire and maintain a set of transmit (Tx) and/or receive (Rx) beams that can be used for downlink and uplink transmission and reception, respectively. Beam management is needed in mmWave systems, because communication channels often suffer from blockage effects due to the smaller wavelengths in mmWave communications; the narrower beamforming of New Radio makes this effect more pronounced. For example, blockage can result from objects near a user's device, such as buildings, but also including the user's own body. Because a user device (user equipment) can move, and because an intervening object such as a vehicle can dynamically change its position and thus abruptly cause or no longer cause blockage, beam management is not static.

Receiver beamforming is particularly significant in overcoming the blockage effect; e.g., to reduce user self-blockage. The basic principle of receiver beamforming is to switch the receiver antenna weighting factors to adjust the effective receiving angle. In this way, the user equipment can adaptively find the propagation path that is blocked, and then adapt to a separate one. To help the user equipment in identifying the signal quality from different receive beams, NR specifications have adopted a receiver beam training procedure which is called CSI-RS (channel state information-reference signals) transmission with repetition 'on'. The basic concept is to repeat CSI-RS transmissions from the same Tx beam multiple times, whereby the user equipment receiver can sweep its receiver beam to find the best one.

The current beam management procedure in New Radio relies on L1-RSRP (layer 1 reference signal received power) measurements for Tx and Rx beams, and does not take interference into account.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
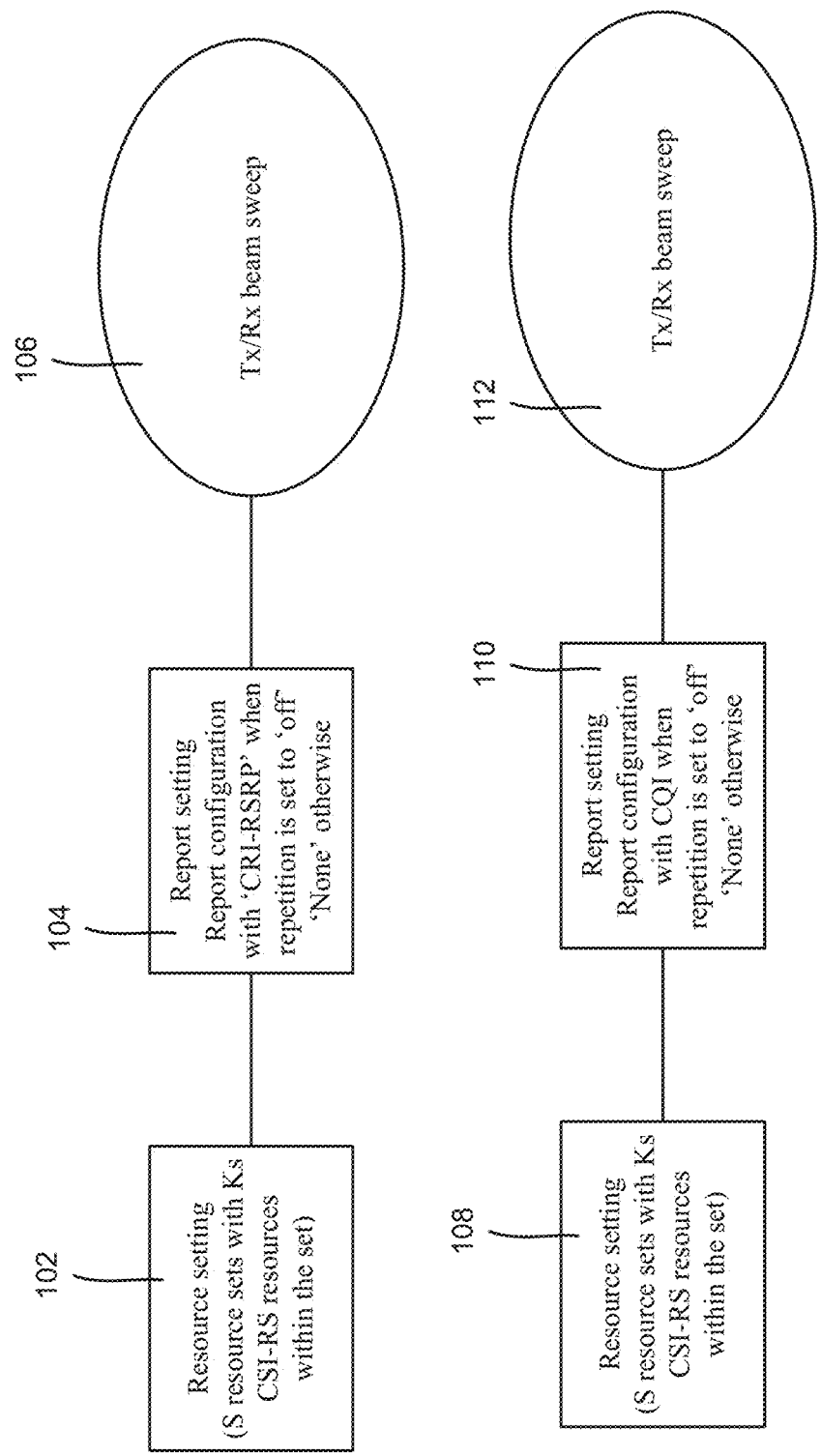
FIG. 1 illustrates an example of two resource settings with associated report settings that can be used for beam management, in accordance with various aspects and embodiments of the subject disclosure.

Various aspects of the technology described herein are directed towards a generalized beam management framework. In one aspect, the beam management framework performs interference management in 5G networks, which is desirable in mmWave communications, e.g., where the cells are smaller. Beam management and directionality are significant in mmWave networks, and hence beam management is needed to steer the beams in the correct direction, including by taking interference into account as described herein.

By way of example, in an integrated access and backhaul (IAB) network, different hops can cause cross link interference to each other, given dynamic time division duplex (TDD), where one cell that is being interfered with (a "victim" cell) can be attempting to receive on the downlink or uplink channel and another interfering IAB node can be transmitting. Including interference measurements in the beam management procedure can alleviate this problem, and help mitigate the interference.

In one aspect described herein is a technology that extends the beam management framework to include different report settings and resource settings configurations that take into account various interference hypotheses. In general, the technology described herein provides a generalized beam management framework that extends the current beam management framework to include beam management based on multiple resource settings and report settings that take interference measurements into account.

In the current beam management procedure, a user equipment is configured with one resource setting such that this resource setting is used for channel measurement for an L1-RSRP computation. For this resource setting, to train receiver beams, the user equipment is configured with a NZP-CSI-RS (non-zero power-channel state information-reference signal) resource set configured with a higher layer repetition parameter set to 'on'. The user equipment may assume that the CSI-RS resources within the NZP-CSI-RS resource set are transmitted with the same downlink spatial domain transmission filter, on different OFDM (orthogonal frequency-division multiplexing) symbols. When repetition is set to 'on', no CSI-report is configured (this parameter value is for the UE to perform receive beam sweeping).

The technology described herein generalizes this framework to include more than one resource setting for beam management, such that in addition to the one resource setting used for channel measurement and L1-RSRP computation, as in the current framework, an additional resource setting is considered for interference measurement performed on CSI-IM (channel state information-interference measurement) or on NZP-CSI-RS. This additional resource setting, with an associated report setting configuration, can convey information about interference—e.g. cross link interference, and whose report can be used to choose a different Tx/Rx beam pair according to a given interference hypothesis.

An aspect of the technology described herein is based on a user equipment's receiving beam tuning process being restricted based on the channel measurement results from the resource setting configured in the particular report setting. As described herein, when a user equipment is configured with multiple report settings, the user equipment has a separate receiving beam tuning process corresponding to each report setting. For example, the network may configure report setting-1 with CSI-RS resources with a strong interference source, while report setting-2 is configured without a strong interference source. The user equipment has an independent procedure on tuning the receiving beam for each of the report settings. It is likely that a different receiving beam often will be selected for one report setting relative to the receiving beam selected for the other report setting.

FIG. 1 illustrates an example of two resource settings with associated report settings used for beam management. In general, in the example of FIG. 1, one resource setting 102 is configured for the beam management procedure, with a corresponding report setting 104 to perform the transmit and receive beam sweep 106. Note that a CSI resource setting such as resource setting 102 contains a configuration of one or more CSI Resource Sets (S), with one or more CSI-RS resources (Ks) within the set. In general, the resource setting 102 can contain information regarding which reference signal type (CSI-RS, SSB) that the user equipment is to measure, time-related behavior, and one or more resource sets containing multiple CSI-RS resources. As described herein, a CSI resource set can specify CSI-RS resources (e.g., NZP CSI-RS or CSI-IM), block resources (for L1-RSRP computation), time-domain behavior, periodicity and slot offset data.

A report setting, such as the report setting 104 can contain information regarding the number of beams on which to report, which CSI parameters to report, and time and frequency information for reporting. For example, the report setting can specify CSI-related or L1-RSRP-related quantities, time-domain behavior, frequency-domain granularity (e.g., reporting band, wideband, subband), time-domain restrictions for channel and interference measurements as described herein, and codebook configuration parameters.

When the transmit beams are being measured and reported, this corresponds to CSI-RS resources with repetition set to 'off' and the configuration set to CRI-RSRP (channel state information reference signal resource indicator reference signal received power). When the receive beams are being measured, this corresponds to CSI-RS resources with repetition 'on' and the report configuration set to 'none' (meaning there is no report; the operation is transparent to the network).

As described herein, in the example given in FIG. 1, an additional resource setting 108 is added to the framework, with a corresponding report setting 110, where in addition to CSI-RS resources for channel measurement, CSI-IM or NZP-CSI-RS is added for interference measurement. The corresponding report setting can have report configuration CRI-SINR (CSI-RS resource indicator-signal-to-interference-plus-noise ratio) or CQI (channel quality information as exemplified in FIG. 1) when repetition is 'off', and 'none' when repetition is 'on.' (Note that the Rx beam sweep operation in the additional resource/report setting can still be transparent to the network.)

Thus, for the second resource setting 108, with NZP-CSI-RS resources or CSI-IM resources to measure interference, the report configuration can comprise a measure of SINR, through a report setting 110/report configuration for the beam management procedure that takes into account interference. The technology can also reuse the report configuration with a CQI-only report to report on the best transmit beams with a given interference hypothesis.

The receive beam procedure with repetition set to 'on' can still be transparent to the network, and no report can be configured to report on the best receive beam for a given interference hypothesis. Alternatively, a new report can be added to report on receive beams in a non-transparent receive beam procedure at the user equipment.

Figure 2:
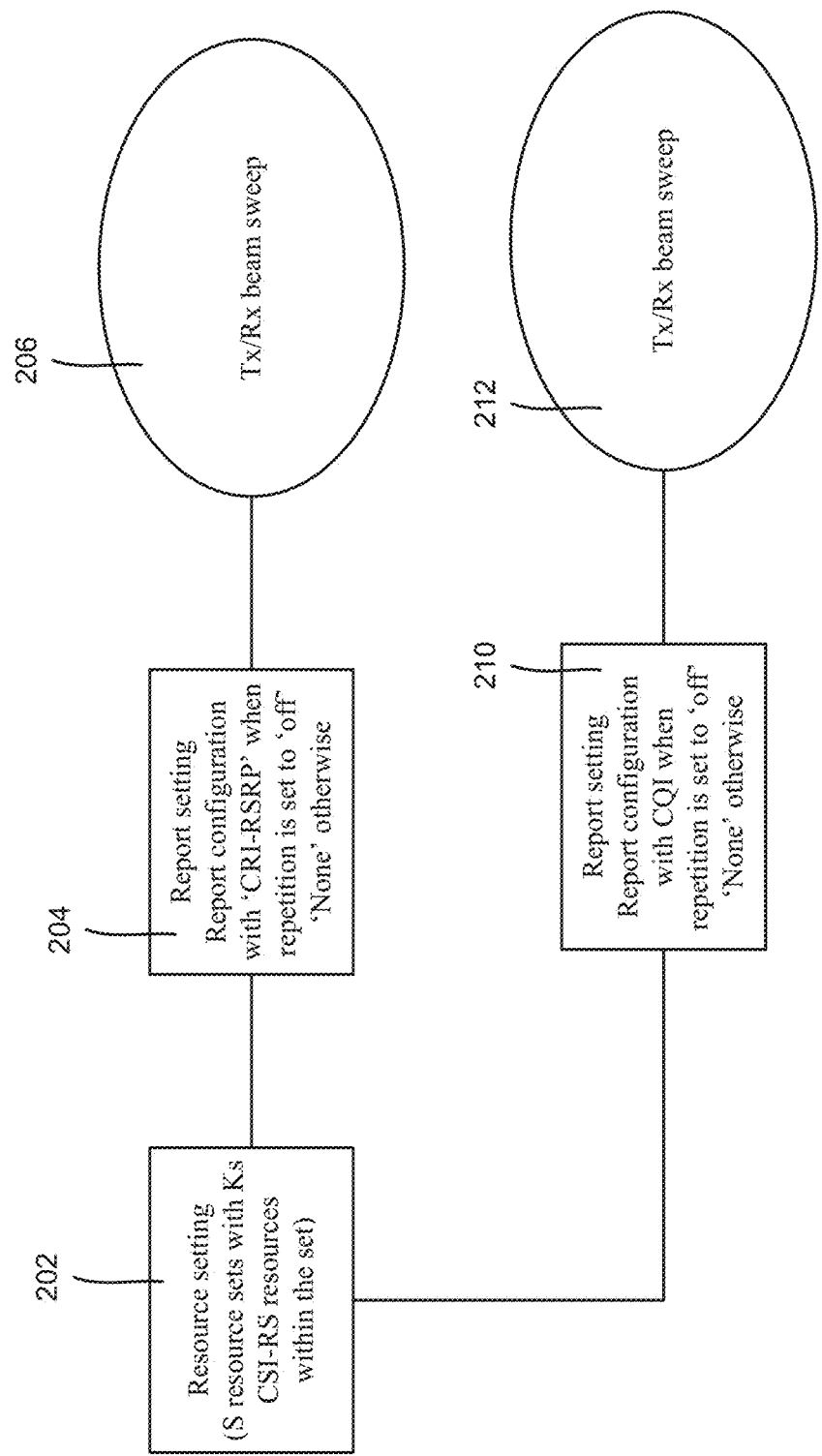
FIG. 2 illustrates an example of a resource setting with two possible associated report settings that can be used for beam management, in accordance with various aspects and embodiments of the subject disclosure.

FIG. 2 shows an alternative example embodiment, in which one resource setting has multiple (in this example, two) associated report settings used for beam management. In general, in the example of FIG. 2, the resource setting 202 is configured for the beam management procedure, with corresponding report settings 204 and 210 to perform the transmit and receive beam sweeps 206 and 212, respectively.

As described herein, in the example given in FIG. 2, the additional resource setting report setting 210 provides, in addition to CSI-RS resources for channel measurement, CSI-IM or NZP-CSI-RS for interference measurement. The corresponding report setting can have report configuration CRI-SINR (CSI-RS resource indicator-signal-to-interference-plus-noise ratio) or CQI (channel quality information as exemplified in FIG. 1) when repetition is 'off', and 'none' when repetition is 'on.' (Note that the Rx beam sweep operation in the additional resource/report setting can still be transparent to the network.)

Figure 3:
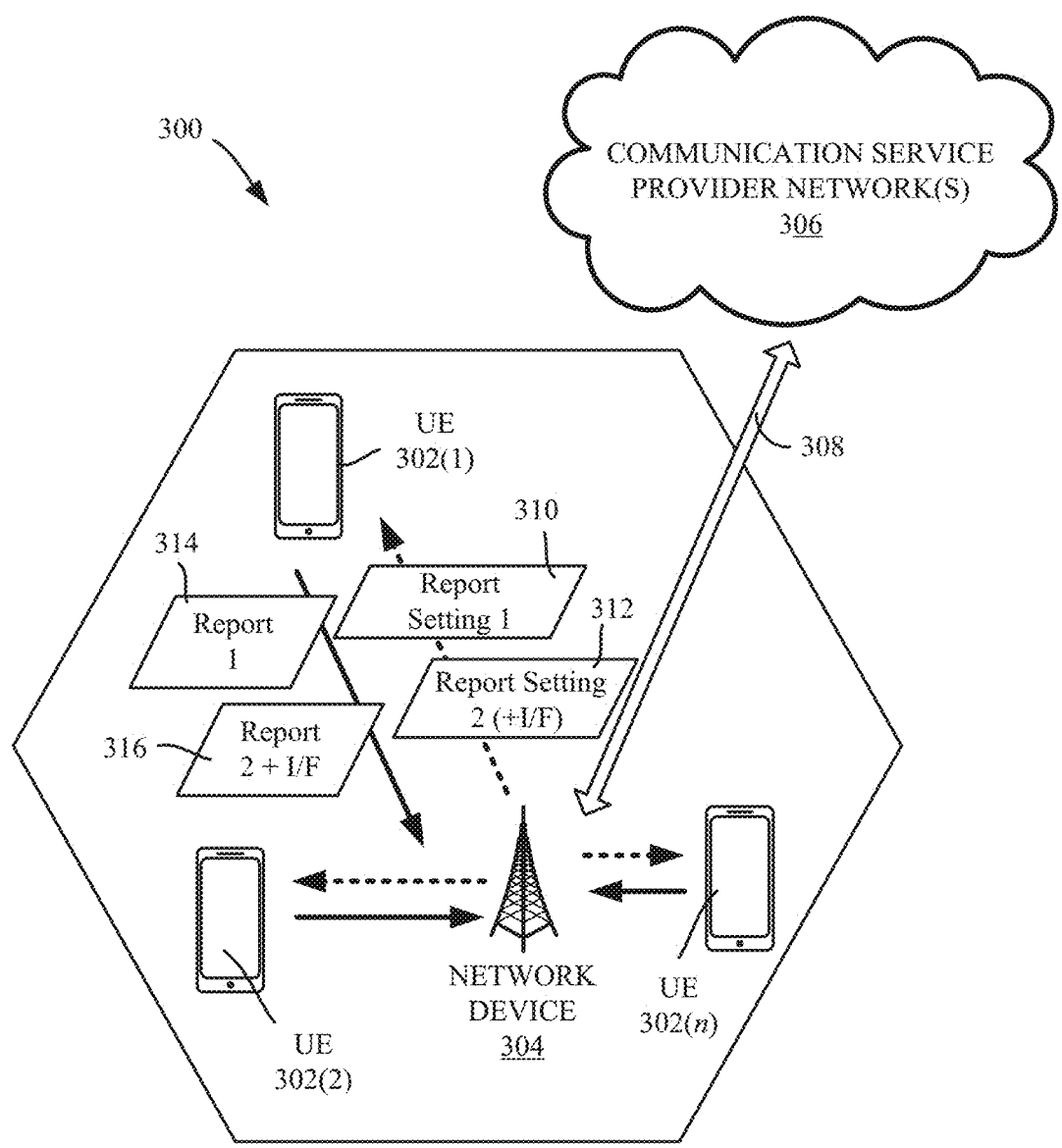
FIG. 3 illustrates an example wireless communication system in which beam management that takes interference into account can be performed, in accordance with various aspects and embodiments of the subject disclosure.

FIG. 3 illustrates an example wireless communication system 300 in accordance with various aspects and embodiments of the subject technology. In one or more embodiments, the system 300 can comprise one or more user equipments, e.g., UEs 302(1)-302(n).

In various embodiments, the system 300 is or comprises a wireless communication network serviced by one or more wireless communication network providers. In example embodiments, a UE 302 can be communicatively coupled to the wireless communication network via a network device 304 (e.g., network node). The network device 304 can communicate with the user equipment (UE), thus providing connectivity between the UE and the wider cellular network.

In example implementations, each UE such as the UE 302(1) is able to send and/or receive communication data via a wireless link to the network device 304. The dashed arrow lines from the network device 304 to the UE 302 represent downlink (DL) communications and the solid arrow lines from the UE 302 to the network device 304 represents uplink (UL) communications.

The system 300 can further include one or more communication service provider networks 306 that facilitate providing wireless communication services to various UEs, including UES 302(1)-302(n), via the network device 304 and/or various additional network devices (not shown) included in the one or more communication service provider networks 306. The one or more communication service provider networks 306 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 300 can be or include a large scale wireless communication network that spans various geographic areas. According to this implementation, the one or more communication service provider networks 306 can be or include the wireless communication network and/or various additional devices and components of the wireless communication network (e.g., additional network devices and cell, additional UEs, network server devices, etc.).

The network device 304 can be connected to the one or more communication service provider networks 306 via one or more backhaul links 308. For example, the one or more backhaul links 308 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 308 can also include wireless link components, such as but not limited to, line-of-sight (LOS) or non-LOS links which can include terrestrial air-interfaces or deep space links (e.g., satellite communication links for navigation).

The wireless communication system 300 can employ various cellular systems, technologies, and modulation schemes to facilitate wireless radio communications between devices (e.g., a UE 302 and the network device 304). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 300 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 300 are particularly described wherein the devices (e.g., the UEs 302 and the network device 304) of system 300 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 300 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 3, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

In FIG. 3, as described herein, a user equipment (e.g., 302(1)) receives resource report setting 1 310 and report setting 2 312, wherein report setting 2 comprises an instruction or the like for the user equipment to consider at least one interference (I/F) hypothesis as described herein with respect to the beam sweep/beam management and reporting operations. Note that although not explicitly shown in FIG. 3, one or more resource settings are also communicated to the user equipment, as represented in FIG. 1 or FIG. 2.

As described herein, based on the beam sweep/beam management operations corresponding to the report settings 310 and 312, the user equipment returns a report 1 314 and report 2 316 (including interference considerations) to the network device 304. The network device 304 can then select a transmit beam based on the data in the reports 314 and 316.

Figure 4:
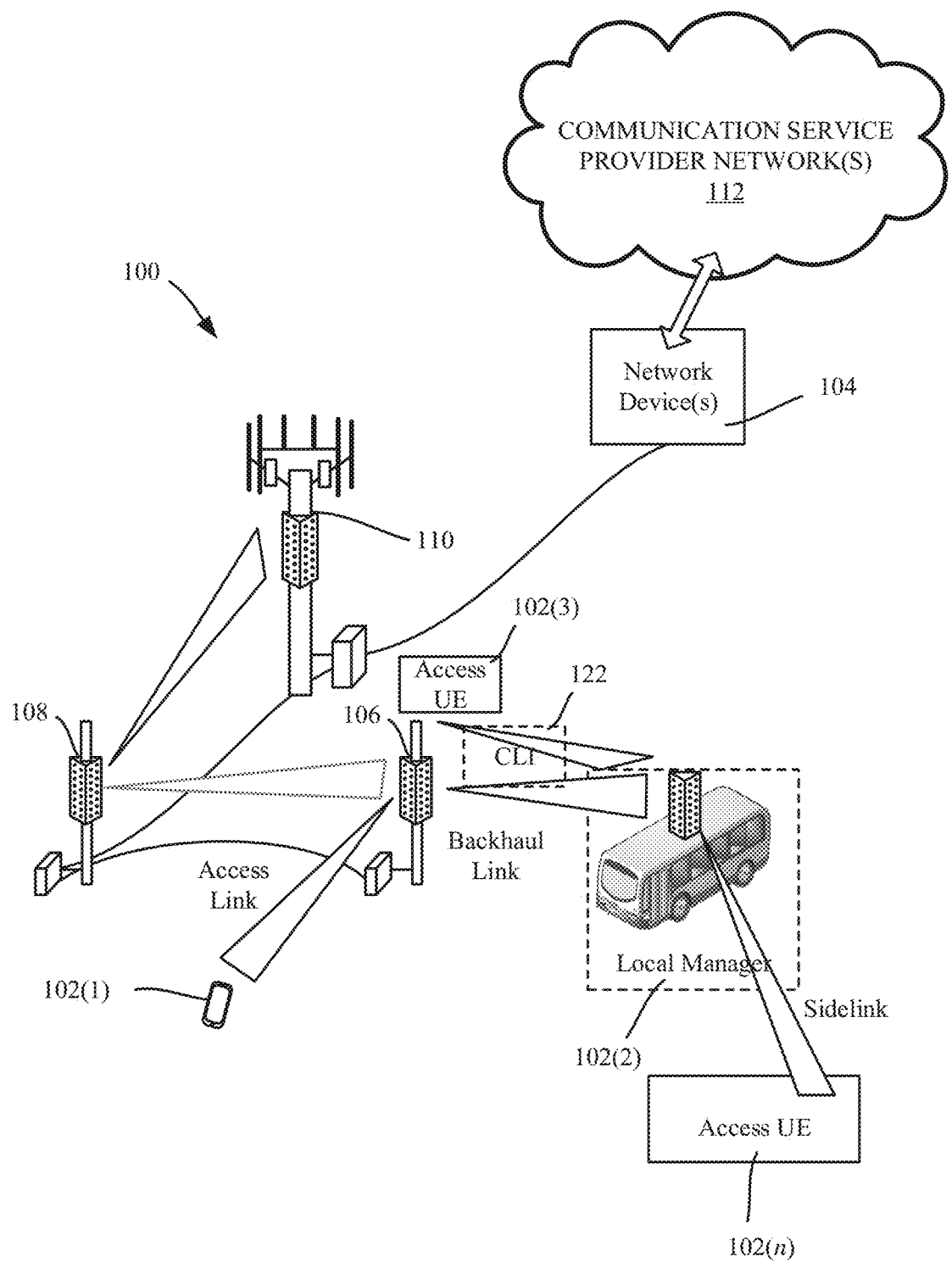
FIG. 4 illustrates an example wireless communication system comprising integrated access, backhaul and sidelink communications, in which beam management that takes interference into account can be performed, in accordance with various aspects and embodiments of the subject disclosure FIGS. 5 and 6 comprise a flow diagram illustrating example operations of a network device with respect to configuring a report request related to beam management that can take interference into account, and communicating with a user equipment device, in accordance with various aspects and embodiments of the subject disclosure.

FIG. 4 shows an example of when interference mitigation, e.g., due to cross link interference in an integrated access and backhaul network, can be part of beam management and reporting operations. To this end, FIG. 4 illustrates an example wireless communication system 400 in accordance with various aspects and embodiments of the subject technology. In general, the wireless communication system 400 provides for integrated Access, Backhaul, (and in this example) Sidelink links.

In one or more embodiments, the system 400 can comprise one or more user equipment's 402(1)-402(n), including at least one user equipment (e.g., 402(2)) that operates as a local manager, (e.g., schedules communications between user equipments in a three-party wireless communication system). In the example shown, a user equipment (e.g., a smartphone 402(1)) couples to the network 404 (e.g., any network device or devices) via an Access link to an antenna 406. The local manager 402(2), e.g., implemented within user equipment present in a bus-type vehicle, communicates with the network 404, including through the antenna 406 via a Backhaul link. Further, access user equipment's 402(3)-402(n) (e.g., in car-type vehicles) communicates with the network 404, via the local manager (user equipment 402(2)) has described herein.

In various embodiments, the system 400 is or comprises a wireless communication network serviced by one or more wireless communication network providers. In example embodiments, a user equipment (collectively or individually 402) can be communicatively coupled to the wireless communication network via a network device 404 (e.g., network node). The network device 404 can communicate with the user equipment (UE) 402, thus providing connectivity between the user equipment and the wider cellular network.

In example implementations, each user equipment 402 such as the user equipment 402(1) is able to send and/or receive communication data via a wireless link to the network device 404. The system 400 can thus include one or more communication service provider networks 412 that facilitate providing wireless communication services to various user equipment, including user equipment's 402(1)-402(n), via the network device 404 and/or various additional network devices (not shown) included in the one or more communication service provider networks 412. The one or more communication service provider networks 412 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 400 can be or include a large scale wireless communication network that spans various geographic areas. According to this implementation, the one or more communication service provider networks 406 can be or include the wireless communication network and/or various additional devices and components of the wireless communication network (e.g., additional network devices and cell, additional user equipment's, network server devices, etc.).

The network device 404 can be connected to the one or more communication service provider networks 412 via one or more backhaul links or the like. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 408 can also include wireless link components, such as but not limited to, line-of-sight (LOS) or non-LOS links which can include terrestrial air-interfaces or deep space links (e.g., satellite communication links for navigation).

In the example of FIG. 4, because of a transmission by the access UE 402(3), cross-link interference (CLI) 422 interferes with the communications between the backhaul link 406 and the local manager 402(2). By beam management that is based in part on interference hypotheses described herein, the effect of the cross-link interference 422 can be mitigated by selecting a different transmit channel that is not subject to as much interference as another channel that could be selected by conventional beam management and reporting techniques.

Figure 5:
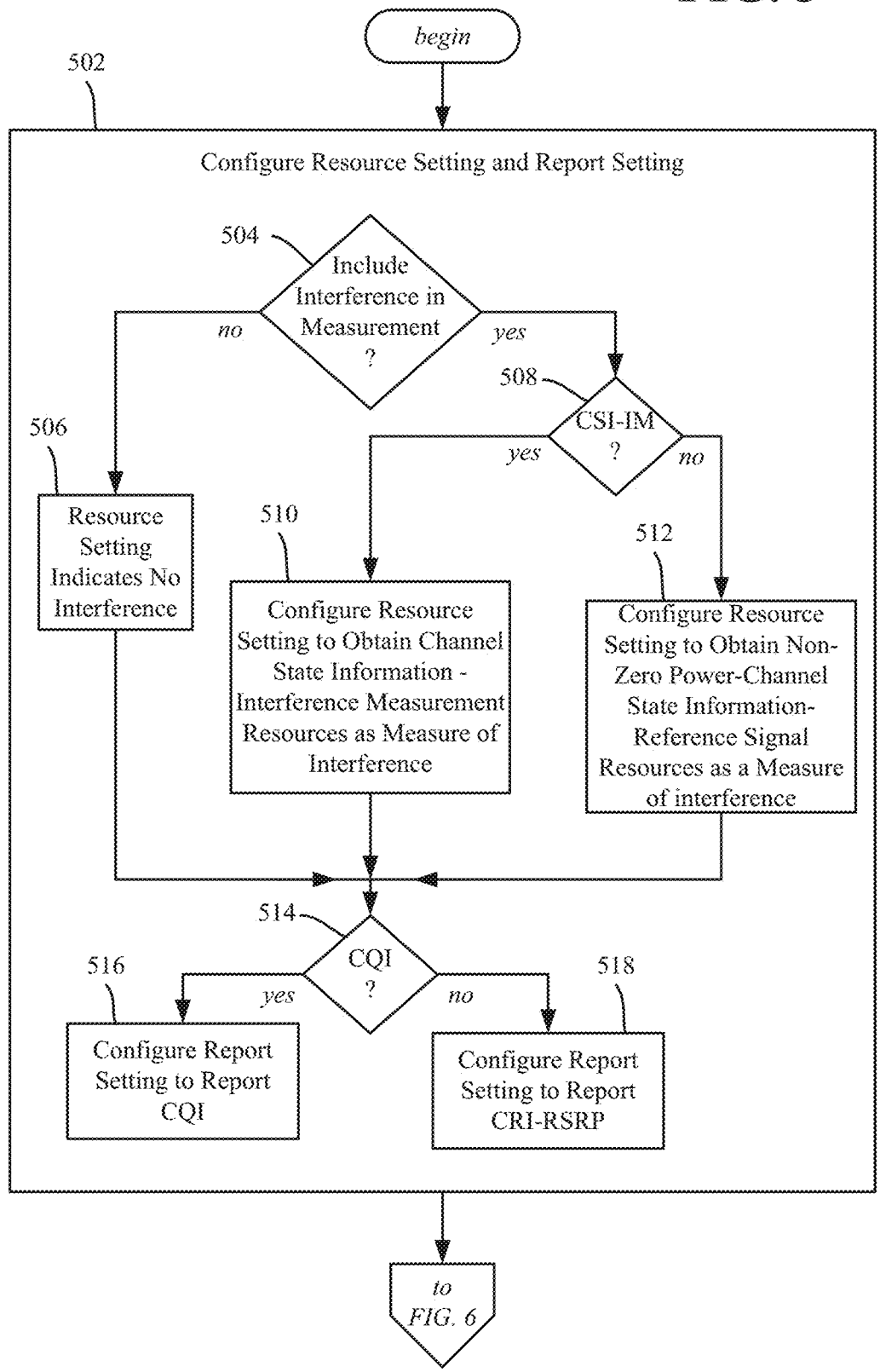
Figure 6:
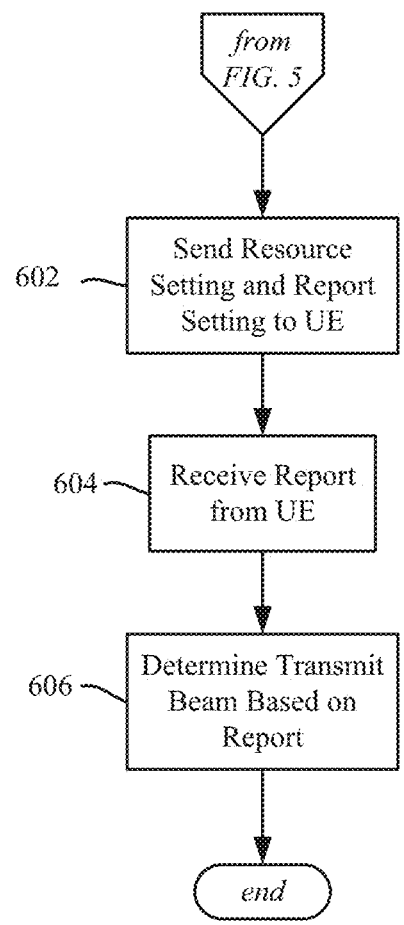

FIGS. 5 and 6 are directed towards one or more example operations/logic that a network device can perform to determine/configure resource settings and report settings (operation 502). As described herein, if interference measurement is not desired as evaluated by operation 504, then the resource setting can be configured at operation 506 to indicate no interference is to be considered in the measurement. Otherwise, if interference is to be measured, in this example operation 508 configures the resource setting to obtain channel state information-interference measurement resources as measure of interference (operation 510), or to obtain non-zero power-channel state information-reference signal resources as a measure of interference (operation 512). It is feasible to measure both, although an additional report can be requested by the network, one for each interference measurement.

Operation 514 differentiates as to whether the report is to return CQI (e.g., rank indicator, or CRI-RSRP, e.g., identifying a beam. Note that CQI can be reported as part a of CSI report, e.g., along with PMI (precoding matrix indicator) and RI (rank indicator) data.

Once configured, the resource setting and report setting are sent to the user equipment to obtain a report, as represented via operations 602 and 604 of FIG. 6. Operation 606 determines (selects) a transmit beam based on the report.

Figure 7:
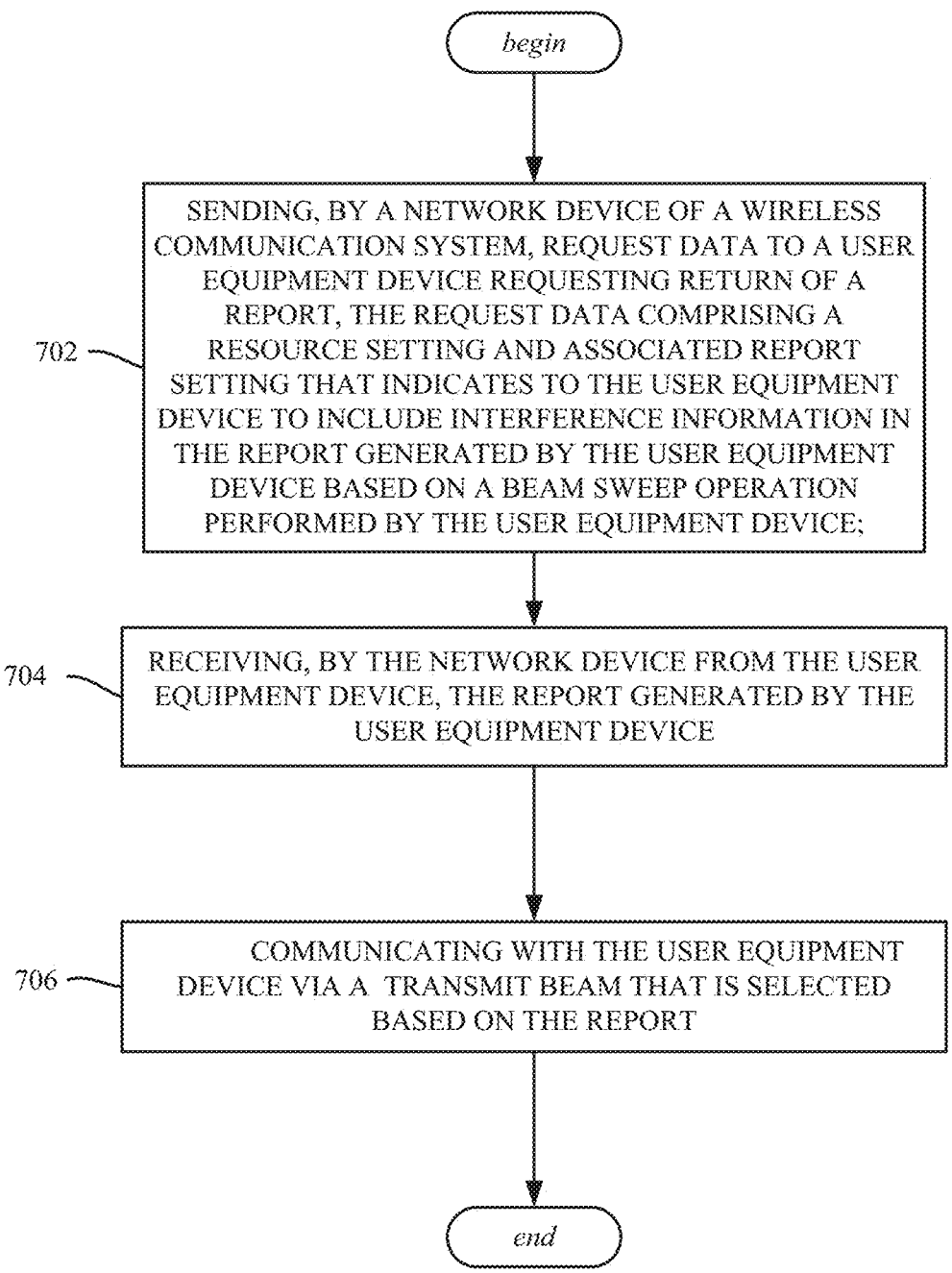
FIG. 7 illustrates example operations of a network device with respect to beam management with interference reporting, in accordance with various aspects and embodiments of the subject disclosure.

One or more aspects, such as those implemented in example operations of a method, are shown in FIG. 7 in accordance with various aspects and embodiments of the subject disclosure. Operation 702 represents sending, by a network device of a wireless communication system, request data to a user equipment device requesting return of a report, the request data comprising a resource setting and associated report setting that indicates to the user equipment device to include interference information in the report generated by the user equipment device based on a beam sweep operation performed by the user equipment device. Operation 704 represents receiving, by the network device from the user equipment device, the report generated by the user equipment device. Operation 706 represents communicating with the user equipment device via a transmit beam that is selected based on the report.

Aspects can comprise instructing, by the network device via the request data, the user equipment device to use non-zero power-channel state information-reference signal resources as a measure of interference. Aspects can comprise instructing, by the network device via the request data, the user equipment device to use channel state information-interference measurement resources as a measure of interference.

Aspects can comprise instructing, by the network device via the request data, the user equipment device to report a channel quality indicator value. Aspects can comprise instructing, by the network device via the request data, the user equipment device to report channel state information reference signal resource indicator reference signal received power. Aspects can comprise instructing, by the network device via the request data, the user equipment device to report channel state information reference signal resource indicator signal-to-interference-plus-noise ratio data.

Receiving the report from the user equipment device can comprise receiving information comprising reference signal received power data. Receiving the report from the user equipment device can comprise receiving information comprising signal-to-interference-plus-noise ratio data.

The resource setting can be a first resource setting, the associated report setting can be a first report setting, and the report can be a first report; aspects can comprise, communicating, by the network device, a second resource setting and associated second report setting to the user equipment device, in which the second report setting indicates to the user equipment device not to include interference information in a second report from the user equipment device.

Figure 8:
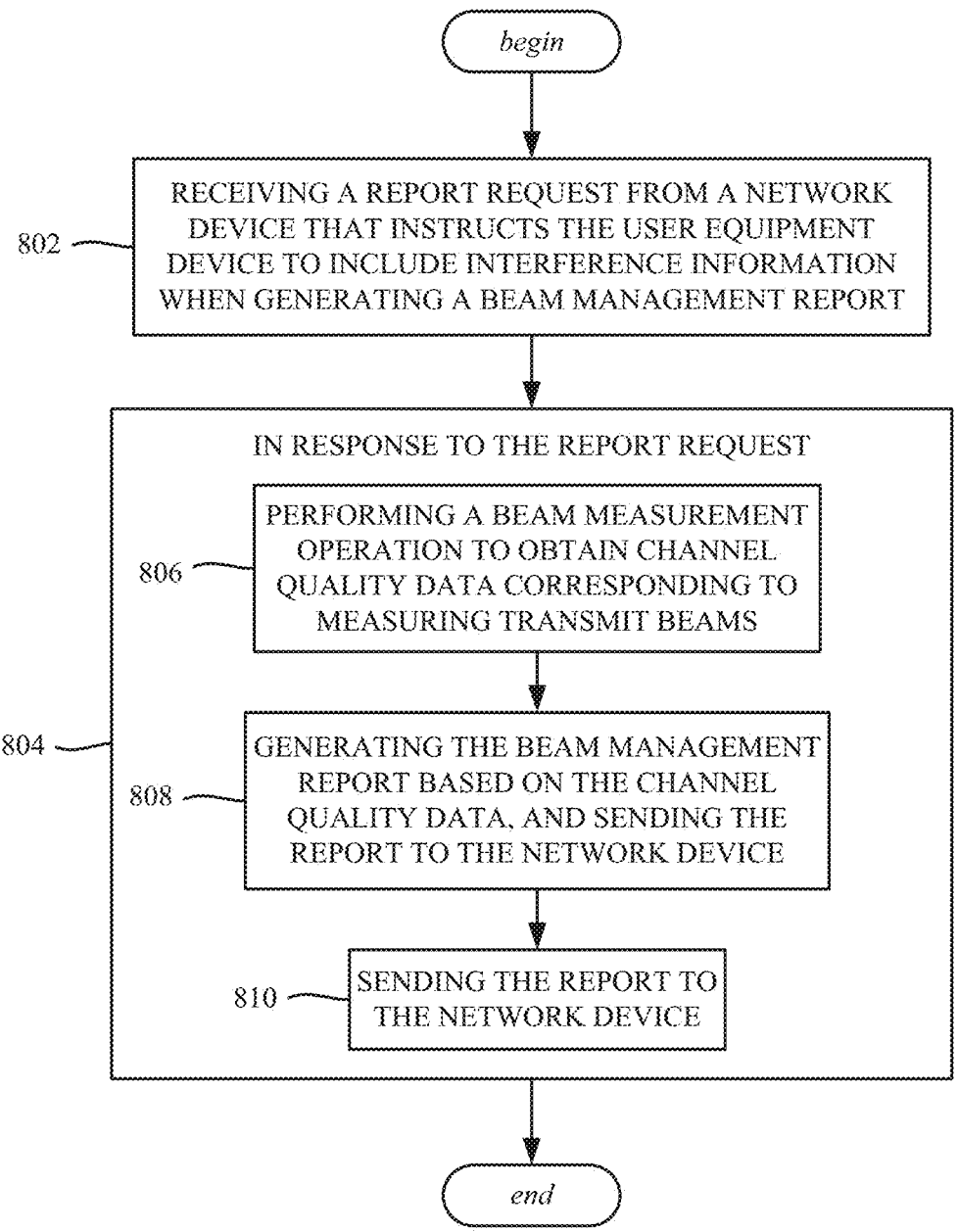
FIG. 8 illustrates example operations of a user equipment device with respect to beam management with interference reporting, in accordance with various aspects and embodiments of the subject disclosure.

One or more example aspects are represented in FIG. 8, and can correspond to a user equipment device comprising a processor and a memory that stores executable instructions that, when executed by the processor, facilitate performance of operations and/or components. Example operations comprise operation 802, which represents receiving a report request from a network device that instructs the user equipment device to include interference information when generating a beam management report. Operation 804 represents, in response to the report request, performing (operation 806) a beam measurement operation to obtain channel quality data corresponding to measuring transmit beams, generating (operation 808) the beam management report based on the channel quality data, and sending (operation 810) the report to the network device.

The report request can further instruct the user equipment device to use non-zero power-channel state information-reference signal resources as a measure of interference. The report request can further instruct the user equipment device to use channel state information-interference measurement resources as a measure of interference.

The report request can further instruct the user equipment device to report a channel quality indicator value as the channel quality data. The report request can further instruct the user equipment device to report channel state information reference signal resource indicator reference signal received power as the channel quality data. The report request can further instruct the user equipment device to report channel state information reference signal resource indicator signal-to-interference-plus-noise ratio as the channel quality data.

Figure 9:
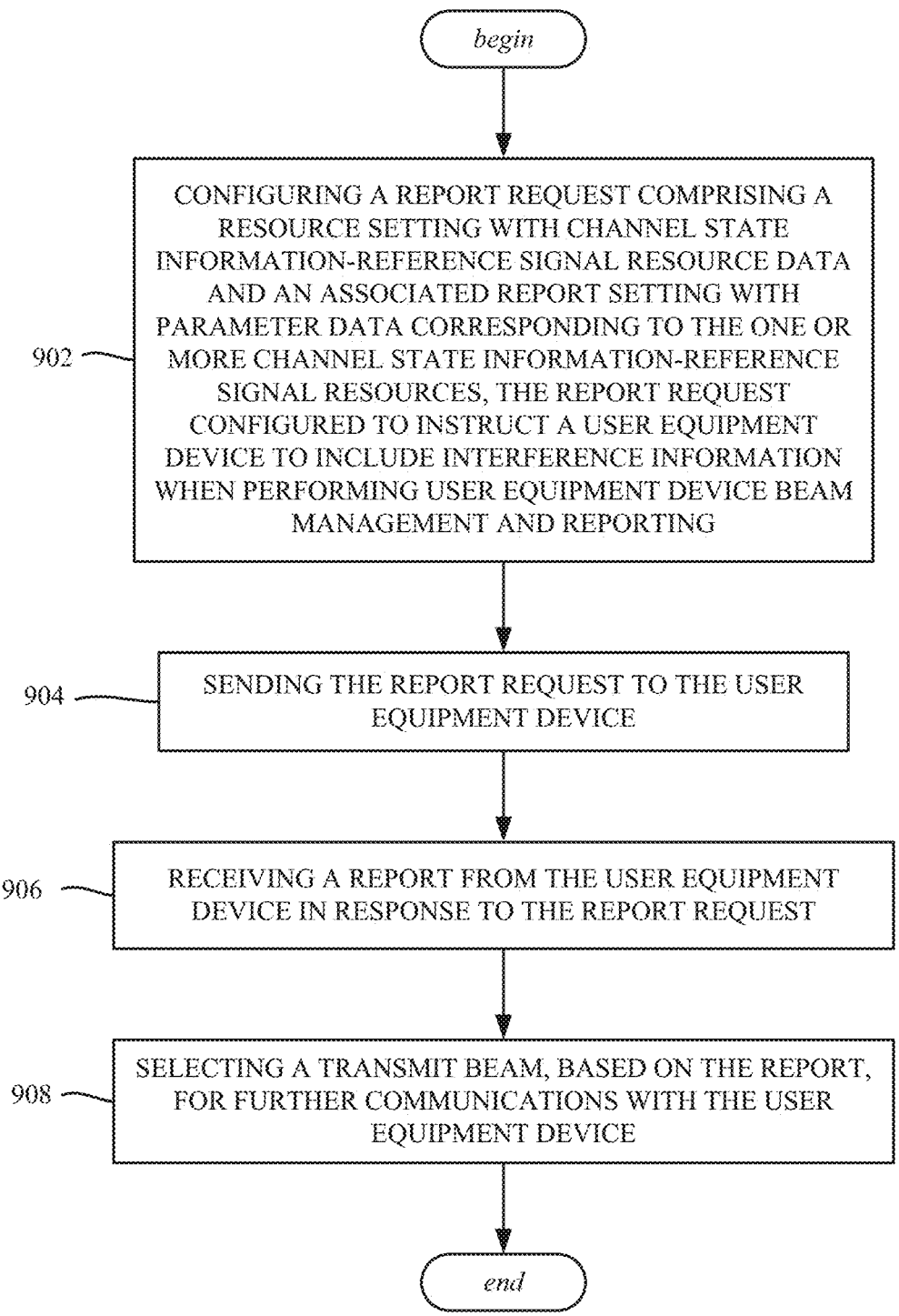
FIG. 9 illustrates example operations of a network device with respect to beam management with interference reporting, in accordance with various aspects and embodiments of the subject disclosure.

One or more aspects, such as implemented in a machine-readable storage medium, comprising executable instructions that, when executed by a processor of a network device of a wireless communication system, facilitate performance of operations, are represented in FIG. 9. Example operations comprise operation 902, which represents configuring a report request comprising a resource setting with channel state information-reference signal resource data and an associated report setting with parameter data corresponding to the one or more channel state information-reference signal resources, the report request configured to instruct a user equipment device to include interference information when performing user equipment device beam management and reporting. Operation 904 represents ending the report request to the user equipment device. Operation 906 represents receiving a report from the user equipment device in response to the report request. Operation 908 represents selecting a transmit beam, based on the report, for further communications with the user equipment device.

Configuring the report request can comprise instructing, by the network device via the request data, the user equipment device to use non-zero power-channel state information-reference signal resources as a measure of interference. Configuring the report request can comprise instructing the user equipment device to use channel state information-interference measurement resources as a measure of interference.

Configuring the report request can comprise instructing the user equipment device to report a channel quality indicator value. Configuring the report request can comprise instructing the user equipment device to report channel state information reference signal resource indicator reference signal received power or instructing the user equipment device to report channel state information reference signal resource indicator signal-to-interference-plus-noise ratio data.

As can be seen, the technology described herein provides a generalized beam management framework that takes into account interference hypothesis in beam measurement and selection. This can be useful in supporting use cases such as IAB, in which cross link interference is detrimental to the operation of IAB networks. The technology provides a generalized beam management procedure framework that is applicable to a multitude of use cases such as IAB and multi-TRP (Transmission Reception Point). The technology establishes a framework to include interference measurement in the beam measurement framework for improved interference mitigation at the transmitter and the receiver. The technology allows for maintaining the transparency of the receiver beam strategy to the network.

Figure 10:
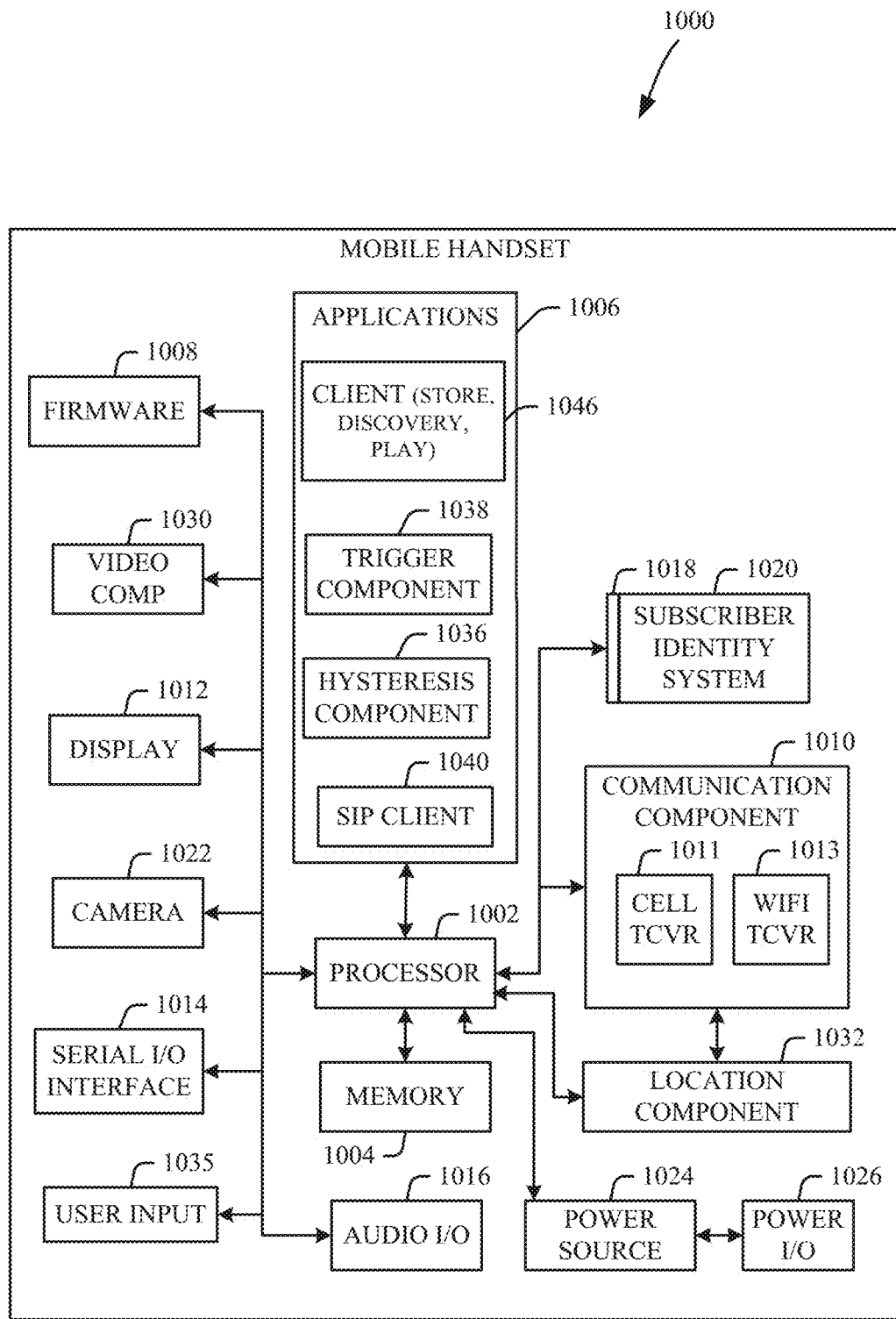
FIG. 10 illustrates an example block diagram of an example user equipment that can be a mobile handset in accordance with various aspects and embodiments of the subject disclosure.

Referring now to FIG. 10, illustrated is a schematic block diagram of an example end-user device such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
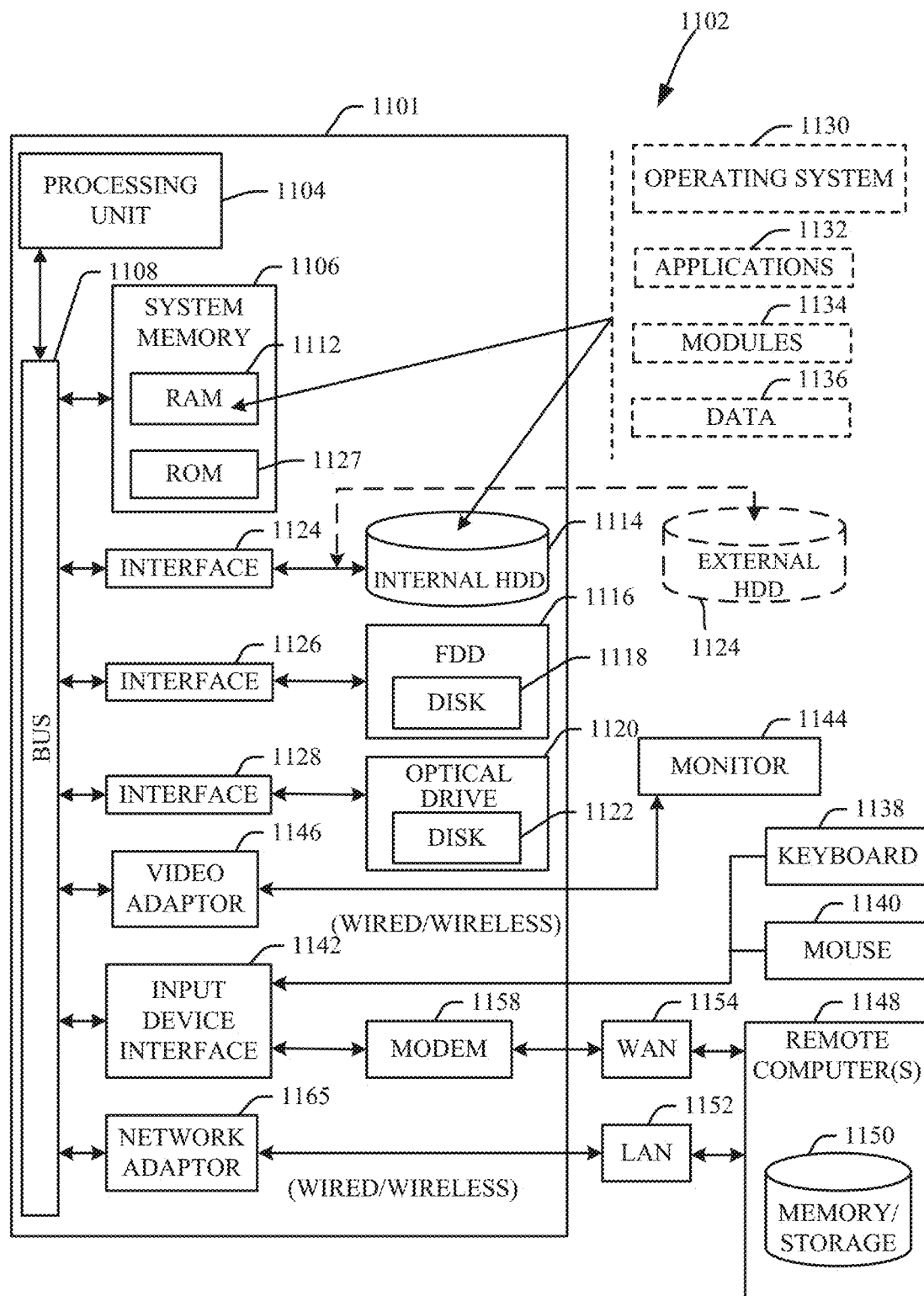
FIG. 11 illustrates an example block diagram of a computer that can be operable to execute processes and methods in accordance with various aspects and embodiments of the subject disclosure.

Referring now to FIG. 11, there is illustrated a block diagram of a computer 1100 operable to execute the functions and operations performed in the described example embodiments. For example, a network node (e.g., network node 304, GNB, etc.) may contain components as described in FIG. 11. The computer 1100 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the various embodiments can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1100 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
sending, by network equipment comprising a processor, a request to a user equipment requesting return of a report, the request comprising a first resource setting and a first report setting that indicates to the user equipment to include channel measurement information in the report generated by the user equipment, and the request further comprising a second resource setting and a second report setting that indicates to the user equipment to include interference information in the report generated by the user equipment based on a beam sweep operation performed by the user equipment and to include channel state information reference signal resource indicator signal-to-interference-plus-noise ratio data in the report;
receiving, by the network equipment from the user equipment, the report generated by the user equipment; and
communicating, by the network equipment, with the user equipment via a transmit beam that is selected based on the report.

2. The method of claim 1, further comprising, instructing, by the network equipment via the second resource setting, the user equipment to use non-zero power-channel state information-reference signal resources as a measure of interference.

3. The method of claim 1, further comprising, instructing, by the network equipment via the second resource setting, the user equipment to use channel state information-interference measurement resources as a measure of interference.

4. The method of claim 1, further comprising, instructing, by the network equipment via the second report setting, the user equipment to report a channel quality indicator value.

5. The method of claim 1, further comprising, instructing, by the network equipment via the first report setting, the user equipment to report channel state information reference signal resource indicator reference signal received power.

6. The method of claim 1, further comprising, instructing, by the network equipment via the request, the user equipment regarding a quantity of beams to use for provision of the report.

7. The method of claim 1, wherein receiving the report from the user equipment comprises receiving information comprising reference signal received power data.

8. The method of claim 1, wherein receiving the report from the user equipment comprises receiving information comprising the channel state information reference signal resource indicator signal-to-interference-plus-noise ratio data.

9. The method of claim 1, further comprising, communicating, by the network equipment, an additional request to the user equipment requesting return of an additional report, the other request comprising an updated second resource setting and an updated second report setting to the user equipment, in which the updated second report setting indicates to the user equipment not to include interference information in the additional report from the user equipment.

10. A user equipment, comprising:
a processor; and
a memory that stores executable instructions that, when executed by the processor, facilitate performance of operations, the operations comprising:
receiving a report request from network equipment, the report request comprising a first resource setting and a first report setting that instructs the user equipment to include channel measurement information when generating a beam management report, and the report request further comprising a second resource setting and a second report setting that instructs the user equipment to include interference information and channel state information reference signal resource indicator signal-to-interference-plus-noise ratio data when generating the beam management report; and
in response to receiving the report request, performing at least one beam measurement operation to obtain channel measurement information and interference information corresponding to transmit beams, generating the beam management report based on the channel measurement information and interference information, and sending the beam management report to the network equipment.

11. The user equipment of claim 10, wherein the second resource setting instructs the user equipment to use non-zero power-channel state information-reference signal resources as a measure of interference.

12. The user equipment of claim 10, wherein the second resource setting instructs the user equipment to use channel state information-interference measurement resources as a measure of interference.

13. The user equipment of claim 10, wherein the second report setting further instructs the user equipment to report a channel quality indicator value.

14. The user equipment of claim 10, wherein the first report setting further instructs the user equipment to report channel state information reference signal resource indicator reference signal received power.

15. The user equipment of claim 10, wherein the report request further instructs the user equipment regarding a quantity of beams that the user equipment is to use to provide the beam management report.

16. A non-transitory machine-readable medium, comprising executable instructions that, when executed by a processor of network equipment, facilitate performance of operations, the operations comprising:
configuring a report request comprising a first resource setting and a first report setting that indicates to a user equipment to include channel measurement information in a report generated by the user equipment, and the request further comprising a second resource setting and a second report setting that indicates to user equipment to include interference information and channel state information reference signal resource indicator signal-to-interference-plus-noise ratio data in the report when performing user equipment beam management and reporting to generate the report;
sending the report request to the user equipment;
receiving the report from the user equipment in response to the report request; and
selecting a transmit beam, based on the report, for further communications with the user equipment.

17. The non-transitory machine-readable medium of claim 16, wherein the second resource setting instructs the user equipment to use non-zero power-channel state information-reference signal resources as a measure of interference.

18. The non-transitory machine-readable medium of claim 16, wherein the resource setting instructs the user equipment to use channel state information-interference measurement resources as a measure of interference.

19. The non-transitory machine-readable medium of claim 16, wherein the second report setting further instructs the user equipment to report a channel quality indicator value.

20. The non-transitory machine-readable medium of claim 16, wherein the first report setting further instructs the user equipment to report channel state information reference signal resource indicator reference signal received power.

\* \* \* \* \*